United States Patent
Wellman et al.

(10) Patent No.: US 8,388,003 B2
(45) Date of Patent: Mar. 5, 2013

(54) FENDER MOUNTING ASSEMBLY

(75) Inventors: Jason D. Wellman, Cedar Falls, IA (US); Christopher A. Bering, Dike, IA (US); Lee R. Rients, Parkersburg, IA (US)

(73) Assignee: Deere & Company, Moline, IL (US)

( * ) Notice: Subject to any disclaimer, the term of this patent is extended or adjusted under 35 U.S.C. 154(b) by 249 days.

(21) Appl. No.: 12/896,125

(22) Filed: Oct. 1, 2010

(65) Prior Publication Data

US 2012/0080908 A1    Apr. 5, 2012

(51) Int. Cl.
   *B62D 25/18* (2006.01)
(52) U.S. Cl. .................................. 280/157; 280/847
(58) Field of Classification Search .................. 280/847, 280/851, 156, 157, 854; 172/508, 509
   See application file for complete search history.

(56) References Cited

U.S. PATENT DOCUMENTS

| 415,021 | A | | 11/1889 | Brown | |
|---|---|---|---|---|---|
| 1,547,059 | A | * | 7/1925 | Massin | ............... 280/849 |
| 5,074,573 | A | | 12/1991 | Dick | |
| 5,169,167 | A | | 12/1992 | Willson et al. | |
| 5,511,808 | A | | 4/1996 | Rowland | |
| 5,794,956 | A | | 8/1998 | Hurlburt et al. | |
| 5,950,975 | A | | 9/1999 | Zieske | |
| 5,975,548 | A | | 11/1999 | Galli et al. | |
| 6,053,517 | A | * | 4/2000 | Lodi et al. | ............... 280/157 |
| 6,109,621 | A | * | 8/2000 | Hettich et al. | ............... 280/5.52 |
| 6,648,373 | B2 | | 11/2003 | Hawes | |
| 6,893,048 | B2 | | 5/2005 | Rush et al. | |
| 7,481,442 | B2 | * | 1/2009 | Lodi et al. | ............... 280/154 |
| 2007/0273122 | A1 | | 11/2007 | Lodi et al. | |

FOREIGN PATENT DOCUMENTS

| DE | 3607000 | 9/1987 |
|---|---|---|
| DE | 20013118 | 11/2000 |
| EP | 0850820 | 7/1998 |
| EP | 1043217 | 10/2000 |
| FR | 2595313 | 3/1987 |
| FR | 2813847 | 9/2000 |

OTHER PUBLICATIONS

New Holland, images of production fender pivot mechanism, 2 pages, date unknown, but in production before invention of present invention.
Massey Ferguson, images of production fender pivot mechanism, 1 page. date unknown, but in production before invention of present invention.
Received German Search Report Jun. 20, 2012 (5 pages).

* cited by examiner

*Primary Examiner* — John Walters

(57) ABSTRACT

A fender mounting assembly is provided for a vehicle steerable wheel. The fender mounting assembly includes a base mounted on the axle and a support pivotally coupled to the base about a pivot axis which is aligned with the kingpin axis. A bumper arm projects from the support. A stop support with a curved arm is fixable at different positions on the axle, and a stop member is fixable at different positions on the arm. The stop member is engagable with the bumper arm to limit pivoting of the fender. The base has a cylindrical pivot pin which is aligned with the kingpin axis. The support has a bearing housing which receives an annular bearing, and the annular bearing receives the pivot pin. A torsion spring is coupled between the base and the support. The fender mounting assembly allows the fender to rotate relative to the wheel. The fender pivot axis is coincident with the kingpin axis and includes stops which can be set in a range of positions to prevent unwanted fender rotation.

12 Claims, 4 Drawing Sheets

FENDER MOUNTING ASSEMBLY

FIELD OF THE INVENTION

The present invention relates to a fender mounting assembly which allows the fender to rotate relative to the wheel/tire assembly.

BACKGROUND OF THE INVENTION

Current John Deere large tractors have pivotal fender mounting assemblies, such as described in U.S. Pat. No. 6,893,048, issued on 17 May 2005, and assigned to the assignee of the present application. This fender pivot assembly includes a fender support rod encased in a tube and supported by visco-elastic isolator. The isolation material allows the fender support rod to rotate when the fender comes in contact with a solid object such as the tractor frame. The isolator can be located in several positions to maintain fender coverage of the tire. This fender pivot does not have an axis of rotation which is coincident with the axle kingpin, and it does not have any mechanism to stop the rotation of the fender relative to the axle.

For compact tractors with fully enclosed engines, it is desired to have fender pivot assembly which has an axis of rotation which is coincident with the axle kingpin, and which has a stop mechanism to stop the rotation of the fender relative to the axle, in order to prevent the fender from contacting plastic engine enclosure parts.

SUMMARY

Accordingly, an object of this invention is to provide a fender pivot assembly which has an axis of rotation which is coincident with the axle kingpin.

A further object of the invention is to provide such a fender pivot assembly which has a stop mechanism to stop the rotation of the fender relative to the axle.

These and other objects are achieved by the present invention, wherein a pivotal fender mounting assembly is provided for a vehicle having steerable wheel which is pivotal with respect to an axle about a kingpin axis. The fender mounting assembly includes a base mounted on the axle and a support pivotally coupled to the base about a pivot axis which is aligned with the kingpin axis. The fender is attached to the support. A bumper member projects from the support. A stop member is engagable with the bumper member to limit pivoting of the fender. The stop member is fixable at a plurality of positions relative to the axle. The stop member is fixable at a selected one of a plurality of positions on the axle. The stop member includes a curved elongated arm with a curved elongated slot formed therein. The stop member is slidably received by the slot.

A pair of parallel spaced-apart mounting surfaces are formed on the axle. A plurality of spaced apart bores are formed in the mounting surface on an upper surface of the axle, and bolts are insertable through the stop member and into selected ones of the bores.

The base includes a cylindrical pivot pin which has an axis which is aligned with the kingpin axis, and the support has a bearing housing which receives an annular bearing, and the annular bearing receives the pivot pin. A torsion spring is coupled between the base and the support, and the annular support surface is received by the torsion spring.

A pair of spaced apart tabs extend from the support and form a slot therebtween. A stop arm projects from the base and is received by the slot. The stop arm is engagable with the tabs to limit rotation of the support relative to the base.

The base includes a pair of legs joined by a bridge member. The bridge member forms a cylindrical support member. The pivot pin projects upwardly from a central part of the support member and is surrounded by an annular support surface. The support comprises a bearing housing. The bearing member receives the pivot pin and is received by the bearing housing. The torsion spring surrounds the support surface and the pivot pin.

DESCRIPTION OF THE PREFERRED EMBODIMENT

Figure 1:
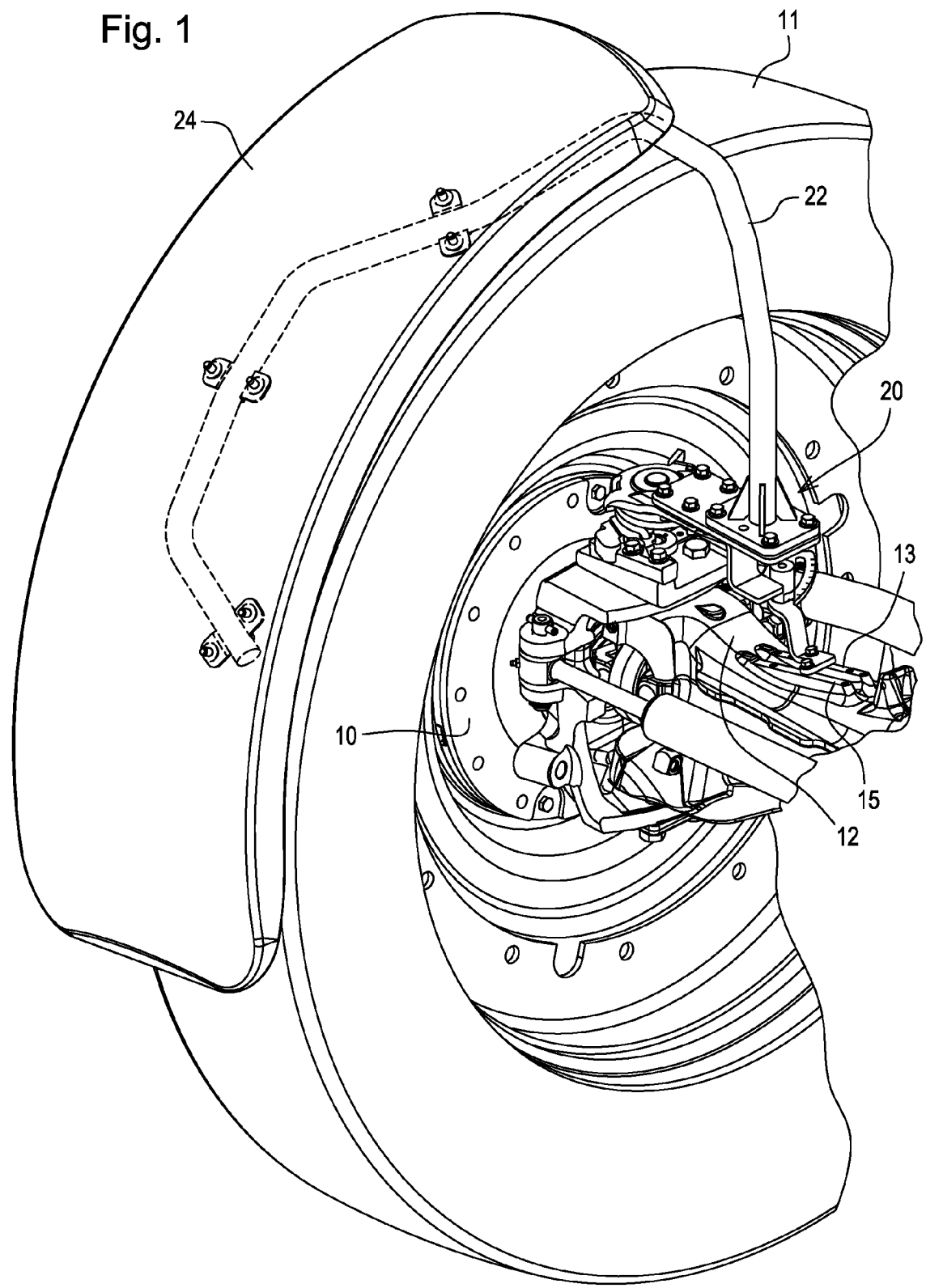
FIG. 1 is a rear side perspective view of a fender pivot assembly embodying the invention.
Figure 2:
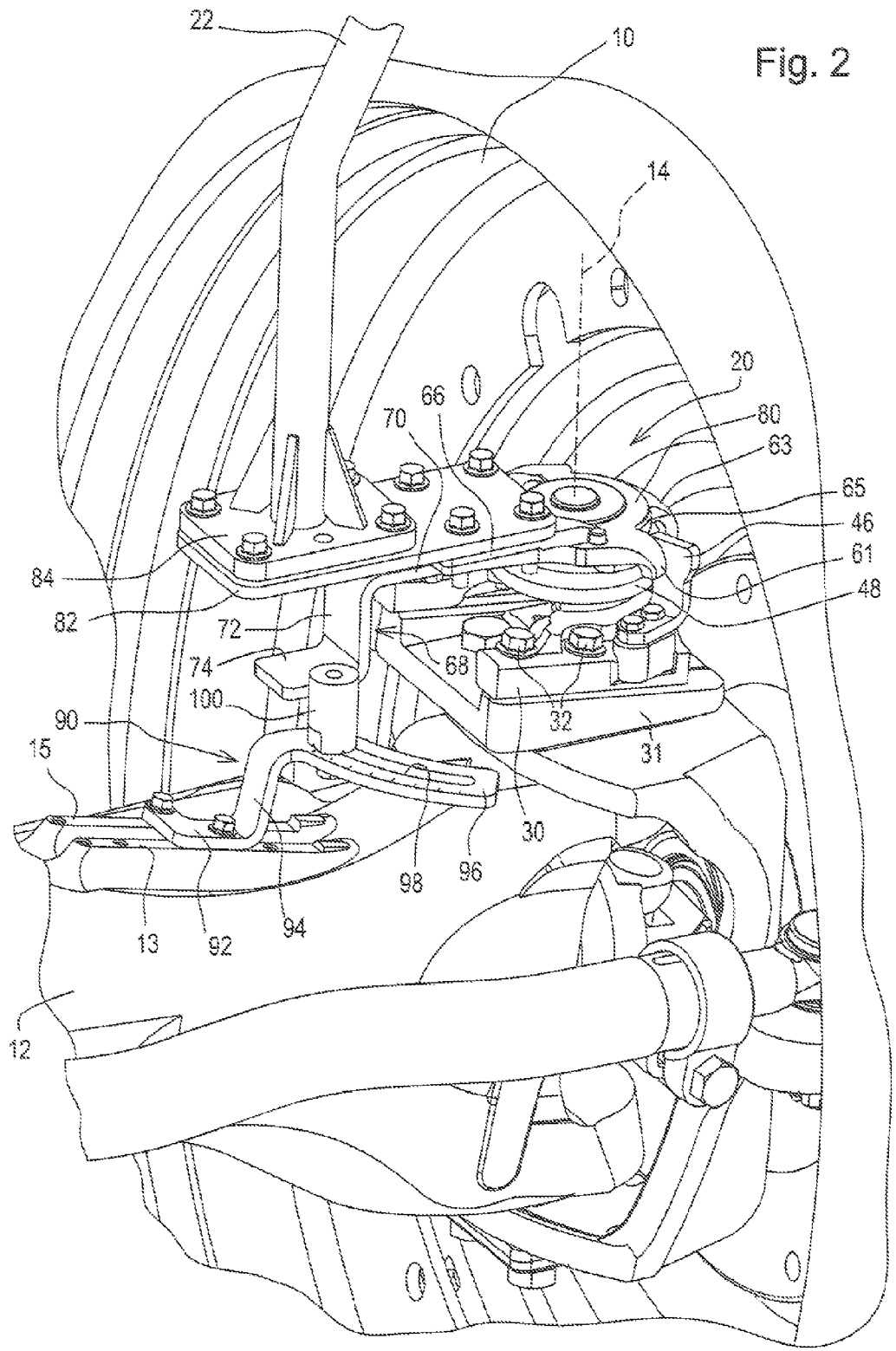
FIG. 2 is a front side perspective view of the fender pivot assembly of FIG. 1.

Referring to FIGS. 1 and 2, a vehicle tire 11 and wheel unit 10 is coupled to an axle member 12, and is pivotal with respect to the axle member 12 about a kingpin axis 14. A fender pivot assembly 20 is mounted on an upper surface of the axle member 12. The fender pivot assembly 20 includes fender support rod 22 which is attached to a fender 24. A pair of parallel linear mounting surfaces 13 and 15 are formed on an upper surface of the axle member 12 inboard with respect to the kingpin axis 14. A plurality of spaced apart threaded bores 16 are formed in the tracks 13 and 15.

Figure 3:
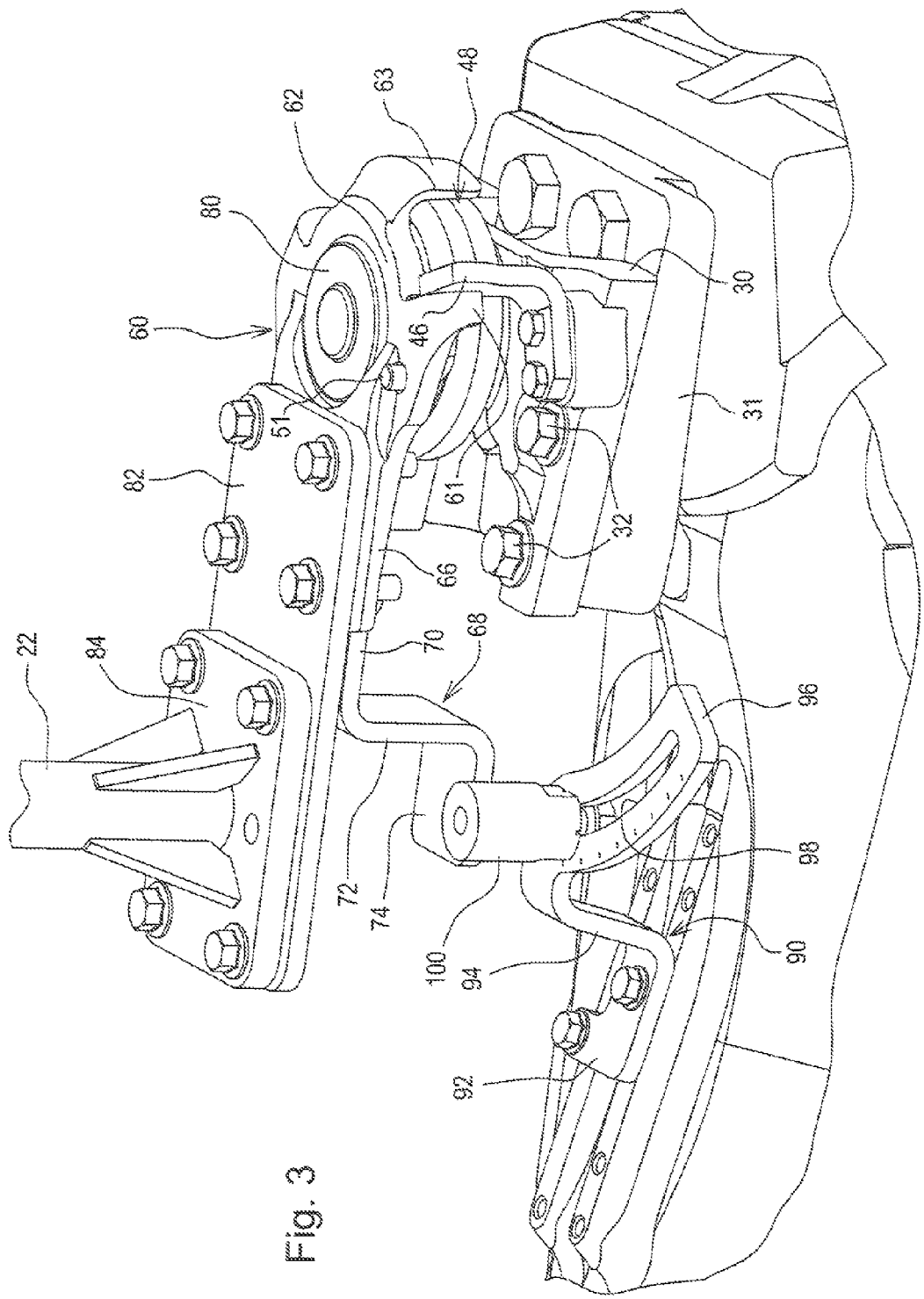
FIG. 3 is an enlarged side perspective view of the fender pivot assembly of FIG. 1.
Figure 4:
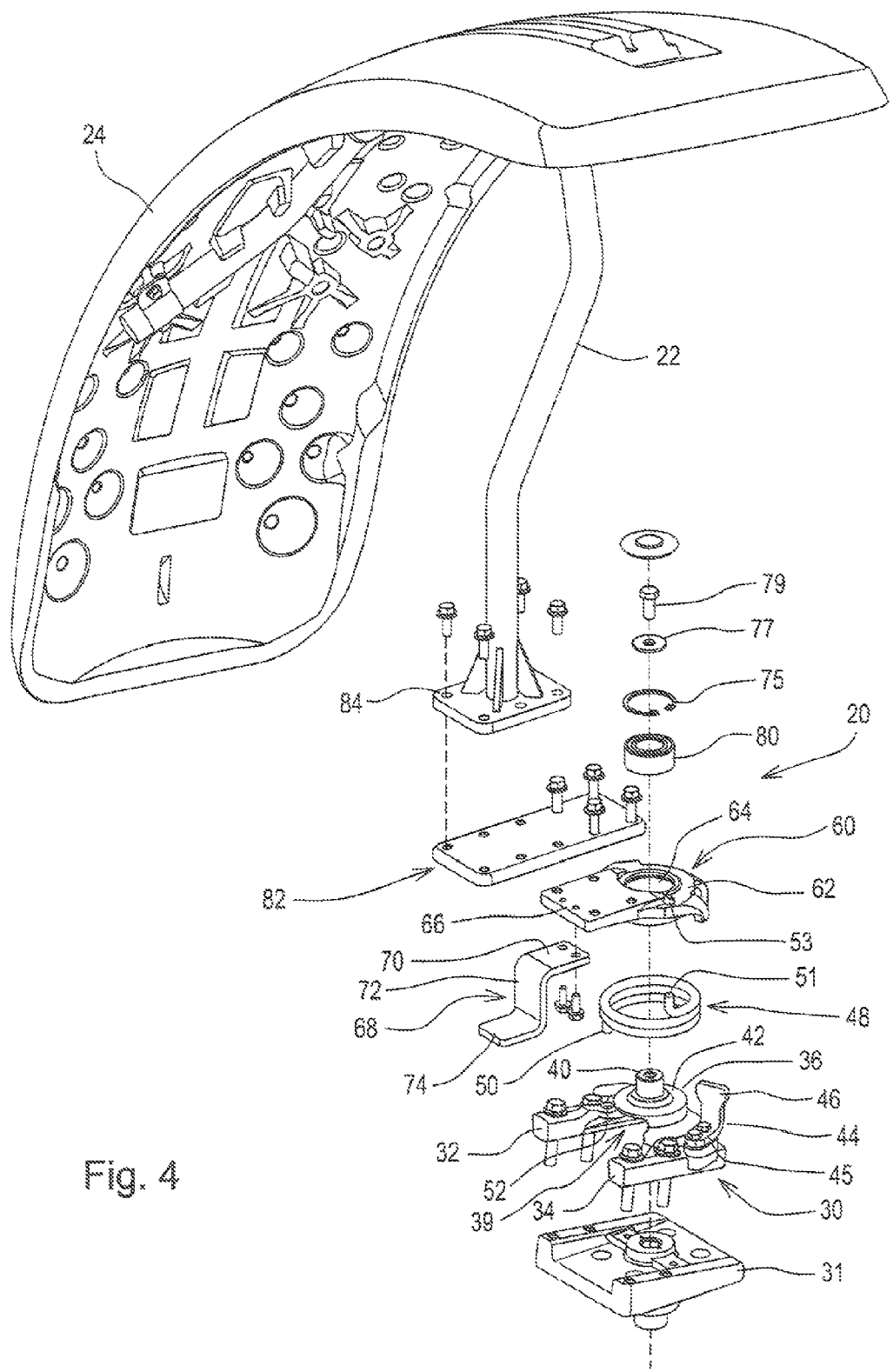
FIG. 4 is an exploded perspective view of the components of the fender pivot assembly of FIG. 1.

Referring now to FIGS. 2-4, the pivot assembly 20 includes a base 30 which is attached, such as by bolts 32, to the upper surface of a known lower base member 31, and to an upper surface of the axle member 12. The lower base member 31 includes a bore which receives a steering sensor (not shown) which is not part of the present invention. The base 30 includes a pair of legs 34, 36 joined by abridge member 38. Bridge member 38 forms a cylindrical support member 39. A cylindrical pivot pin 40 projects upwardly from a central part of the support member 39 and is surrounded by an annular support surface 42. The axis of pivot pin 40 is preferably aligned with the kingpin axis 14. A stop bracket 44 has a first leg 45 which is attached to leg 34 and has second leg or stop arm 46 which projects upwardly therefrom. The base 30 supports a torsion spring 48 which an end 50 which is received in a bore 52 formed in the base 30. The spring 48 surrounds the support surface 42 and the pivot pin 40.

The pivot assembly 20 also includes an upper or bearing housing 60. Bearing housing 60 includes a bearing part 62 through which extends bearing bore 64, and a plate 66 which projects horizontally from the bearing part 62. As best seen in FIG. 2, bearing part 62 includes a pair of spaced apart tabs 61 and 63 which extend radially outwardly and downwardly and form a slot 65 therebetween. The slot 65 receives the stop arm 46. The spring is held between bearing housing 60 and the base 30, and has an end 51 which received in a bore 53 formed in bearing part 62. The spring is biased to urge bearing housing 60 counter-clockwise, viewing FIG. 2, and to hold arm 61 in engagement with stop arm 46. A bumper member 68 includes a first leg 70 which is attached to plate 66, a second leg 72 which depends downwardly from leg 70 and a third leg 74 which projects horizontally from the lower end of second leg 72.

Bearing bore 64 receives an annular bearing 80. Bearing 80 receives pivot pin 40 so that the bearing housing 60 is rotatable about the axis of pivot pin 40. The bearing 80 may be secured by a conventional snap ring 75, washer 77 and bolt 79 which threads into a threaded bore in the pivot pin 40.

A rectangular plate 82 is attached to plate 66. The fender support rod 22 has a base 84 which is attached, such as by bolts, to the plate 82. An axle stop bracket 90 has a base 92 which is attached, such as by bolts, to the mounting surfaces 13 and 15. A leg 94 projects upwardly from base 92 and supports a bracket arm 96 which has a curved slot 98 formed therein. The slot 98 is preferably concave in a direction towards the axis 14. A stop pin 100 is attached to the arm 96 and can be placed at various positions along the slot 98. The slot 98 is preferably long enough to permit the position of pin 100 to be adjusted over an arc of approximately 35 degrees, and the arm 96 may be marked with a series of markings associated with different positions of the pin 100. The slot 98 preferably has a center of curvature which is aligned with the kingpin axis 14. The base 92 can be attached at various positions along the mounting surfaces 13 and 15. The bumper member 68 and the pin 100 form a stopping mechanism which sets the allowable fender rotation to prevent any unwanted contact between the fender 24 and the rest of the machine.

Viewing FIG. 1, as the wheel 10 pivots about kingpin axis 14 (in the counter-clockwise direction), the fender 24 and the entire pivot assembly 20 normally pivots with the wheel 10. These components all pivot together until bumper leg 74 engages stop pin 100, whereupon further pivoting of the bearing housing 60, rod 22 and the fender 24 is prevented, while the wheel 10 may continue to pivot. The position of the bracket 90 relative to the mounting surfaces 13 and 15 can be adjusted, and the position of the stop pin 100 relative to the bracket arm 96 can be adjusted as desired to prevent the fender 24 from engaging a side panel (not shown) of the tractor (not shown). In addition, pivoting of the fender 24 and the bearing housing 60 is limited by the engagement of stop arm 46 with tabs 61 and 63.

The bearing 80 and the spring 48 allow rotation of the fender 24 about an axis which is coincident with the axle kingpin axis. As a result, the clearance between the tire 11 and fender 24 is consistent throughout the range of fender positions.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a vehicle having steerable wheel pivotal with respect to an axle about a kingpin axis, and a fender, a fender mounting assembly comprising:
a base mounted on the axle;
a support pivotally coupled to the base about a pivot axis which is aligned with the kingpin axis, the fender being attached to the support:
a bumper member on the support;
a stop member engagable with the bumper member to limit pivoting of the fender, the stop member being fixable at a plurality of positions relative to the axle;
a stop support fixable at a selected one of a plurality of positions on the axle, the stop support comprises an elongated arm; and
the stop member being fixable at a selected one of a plurality of positions on the arm.

2. The fender mounting assembly of claim 1, wherein:
the arm includes and elongated slot formed therein; and
the stop member is slidably received by the slot.

3. The fender mounting assembly of claim 2, wherein:
the elongated slot is curved.

4. The fender mounting assembly of claim 1, wherein:
a plurality of spaced apart bores are formed in an upper surface of the axle; and
a bolt is insertable through the stop support and into a selected one of the bores.

5. The fender mounting assembly of claim 1, wherein:
a pair of spaced-apart mounting surfaces are formed on the axle;
a plurality of spaced apart bores are formed in the mounting surfaces; and
a pair of bolts are insertable through the stop support and into a selected one of the bores.

6. The fender mounting assembly of claim 5, wherein:
the mounting surfaces are parallel to each other.

7. The fender mounting assembly of claim 1, wherein:
a torsion spring is coupled between the base and the support.

8. The fender mounting assembly of claim 7, wherein:
the annular support surface is received by the torsion spring.

9. In a vehicle having steerable wheel pivotal with respect to an axle about a kingpin axis, and a fender, a fender mounting assembly comprising:
a base mounted on the axle;
a support pivotally coupled to the base about a pivot axis which is aligned with the kingpin axis, the fender being attached to the support:
a bumper member on the support;
a stop member engagable with the bumper member to limit pivoting of the fender, the stop member being fixable at a plurality of positions relative to the axle;
a pair of spaced apart tabs extend from the support and form a slot therebetween; and
a stop arm projects from the base and is received by the slot, the stop arm being engagable with the tabs to limit rotation of the support relative to the base.

10. In a vehicle having steerable wheel pivotal with respect to an axle about a kingpin axis, and a fender, a fender mounting assembly comprising:
a base mounted on the axle;
a support pivotally coupled to the base about a pivot axis which is aligned with the kingpin axis, the fender being attached to the support:
a bumper member on the support;
a stop member engagable with the bumper member to limit pivoting of the fender, the stop member being fixable at a plurality of positions relative to the axle;
the base comprises a pair of legs joined by a bridge member, the bridge member forming a cylindrical support member;
pivot pin projects upwardly from a central part of the support member and is surrounded by an annular support surface;
the support comprises a bearing housing;
a bearing member receiving the pivot pin and received by the bearing housing; and
a torsion spring surrounding the support surface and the pivot pin, the torsion spring being coupled between the base and the bearing housing.

11. In a vehicle having steerable wheel pivotal with respect to an axle about a kingpin axis, and a fender, a fender mounting assembly comprising:
- a base mounted on the axle;
- a support pivotally coupled to the base about a pivot axis which is aligned with the kingpin axis, the fender being attached to the support:
- a bumper member on the support;
- a stop member engagable with the bumper member to limit pivoting of the fender, the stop member being fixable at a plurality of positions relative to the axle;
- the support includes a pair of spaced apart tabs which extend radially outwardly and downwardly and form a slot therebetween; and
- a stop arm is fixed with respect to the axle and is received by the slot, pivoting of the support with respect to the base is limited by engagement of stop arm with the tabs.

12. The fender mounting assembly of claim 11, wherein: the stop arm is mounted on the base.

* * * * *